United States Patent [19]

Bliley

[11] Patent Number: 4,504,530
[45] Date of Patent: Mar. 12, 1985

[54] LINED PRESSURE VESSELS

[75] Inventor: Ward L. Bliley, Chesterland, Ohio

[73] Assignee: Structural Fibers, Inc., Mentor, Ohio

[21] Appl. No.: 572,469

[22] Filed: Jan. 20, 1984

Related U.S. Application Data

[62] Division of Ser. No. 359,045, Mar. 17, 1982, Pat. No. 4,446,092.

[51] Int. Cl.³ .............................................. B65D 1/16
[52] U.S. Cl. .................................... 428/35; 428/280; 220/3
[58] Field of Search ................. 264/258, 314; 428/35, 428/280, 212; 220/3

[56] References Cited

U.S. PATENT DOCUMENTS

| Re. 25,241 | 4/1956 | Randolph | 264/258 |
|---|---|---|---|
| 2,977,269 | 6/1958 | Nerwick | 264/258 |
| 3,937,781 | 2/1976 | Allen | 264/258 |
| 4,124,678 | 11/1978 | Stroupe | 264/314 |

Primary Examiner—John E. Kittle
Assistant Examiner—James J. Seidleck
Attorney, Agent, or Firm—Pearne, Gordon, Sessions, McCoy, Granger & Tilberry

[57] ABSTRACT

A method of making hollow, fiber-reinforced resin articles having a resin-rich interior coating is disclosed. The interior coating provides a chemically resistant surface and inhibits wicking of fluids through the sidewall of the tank which tends to degrade the resin. The coating is formed by positioning a hollow lay-up of loosely felted reinforcing fibers against the inner surface of a rigid mold having a cylindrical wall portion and domed end portions. A polyester fiber surfacing fabric is placed against the inner surface of the lay-up. The surfacing fabric and lay-up are compressed against the mold wall by a pressurized inflatable core to hold the fabric and lay-up in place. A metered amount of a thermosetting resin is injected into the mold, and the pressure of the inflatable core is increased to compress the lay-up, to evenly distribute the resin throughout the lay-up, and to form a resin-rich coating with said surfacing fabric.

3 Claims, 4 Drawing Figures

LINED PRESSURE VESSELS

BACKGROUND OF THE INVENTION

This is a division of application Ser. No. 359,045, filed Mar. 17, 1982, now U.S. Pat. No. 4,446,092.

This invention relates to an improvement in techniques for the manufacture of hollow, fiber-reinforced articles, and more particularly it pertains to a process for forming a resin-rich inner coating in a pressure vessel to eliminate possible wicking of chemicals through the wall of the vessel. This invention is an improvement in the type of molding technique described in U.S. Pat. No. 2,977,269 to Nerwick and U.S. Pat. No. Re. 25,241 to Randolph. According to the techniques described in those patents, hollow, cylindrical, fiber-reinforced plastic tanks have been successfully and economically pressure-molded. Generally, those techniques include the steps of laying up a fiber form within a rigid mold casing in the approximate form of the desired article. A complete fiber form may include preformed, matted fiber end wall caps which telescope into a laid up cylindrical sidewall portion. More desirably, the fiber form comprises a preformed tube having a closed end, as described in U.S. Pat. No. 3,911,965 and a single preformed end cap closing the open end of the preform.

An expandable bag or envelope, which will define the interior shape of the finished article, is positioned within the fiber form in the mold. Rigid casing caps, which shape the end walls of the final article, are clamped to the ends of the mold casing to enclose the laid-up form. With the fiber form and mold thus assembled, the fiber form is placed under a suitable moderate pressure by expanding the bag to hold it in place against the mold. The fiber form is then permeated with a thermosetting resin or the like. The bag, besides defining the interior surface of the molded tank and determining the proper fiber-to-resin ratio, compresses the fiber form in such a manner as to avoid migration of fibers with resin flow and resulting destruction of the lay-up. The bag is further expanded to compress the lay-up and to evenly distribute the resin throughout the lay-up. The mold is then heated to cure the resin, the bag is removed from the interior of the molded tank, and the finished molded tank is removed from the mold.

Tanks produced in accordance with the aforementioned prior art techniques have been widely employed as water softener tanks, swimming pool filter tanks, and the like. One problem exists, however, which is not serious when the tanks are employed to hold water, but which is serious when the tanks are employed to hold corrosive chemicals. That problem involves a phenomenon known as "wicking," wherein fibers may communicate with the inner surface of the tank and the outer surface of the tank. In such an instance, the fluid contained in the tank may be drawn along the fiber by capillary action so that the fluid migrates through the sidewall of the tank to thereby degrade the plastic to a degree causing failure of the tank and forms a finely beaded liquid coating on the exterior surface.

In view of this problem, attempts have been made to line the interior of the tank with a resin-rich or gel coat. This involves a separate step in the process, since the operation is performed after the tank is cured and removed from the mold. Furthermore, such an operation results in a secondary bond between the molded sidewall of the tank and the coating, which creates the possibility of delamination of the coating during use.

SUMMARY OF THE INVENTION

According to this invention, a resin-rich coating is provided on the inner surface of a fiber-reinforced pressure vessel during the molding operation. This resin-rich coating is induced by providing a polyester fiber surfacing fabric on the inner sidewall of the vessel during the molding operation. The fabric becomes permeated with the resin to thereby provide a barrier between the fibrous reinforcing material and the interior of the tank.

More specifically, the pressure vessel is produced by positioning a hollow lay-up of loosely felted reinforcing fibers against the inner surface of a rigid mold having a cylindrical wall portion and domed end portions. A polyester surfacing fabric is formed in the shape of a tube having a diameter approximating the inside diameter of the tank to be molded. The fabric tube is slipped over an inflatable core or mandrel, and that entire assembly is positioned within the rigid mold and the mold is closed but vented to the atmosphere. The bag is pressurized to hold the surfacing fabric in place against the hollow lay-up and to hold the hollow lay-up in place against the inner surface of the mold. A metered amount of thermosetting resin is injected into the mold and the pressure of the core is increased to compress the lay-up and to evenly distribute the resin throughout the lay-up and form a resin-rich coating with the surfacing fabric. The resin is then cured and the molded article is removed from the mold.

By providing a resin-rich coating with the surfacing fabric having a fiber-to-resin ratio less than the fiber-to-resin ratio of the resin-impregnated lay-up, a barrier is formed between the interior of the tank and the reinforcing fibers in the lay-up. That barrier effectively minimizes the effect of capillary wicking of fluids along those reinforcing fibers which would otherwise have portions exposed to the interior of the tank. Such wicking tends to craze the resin system, causing the eventual breakdown of the laminate.

It is believed that the fibers which are subjected to wicking separate from the surrounding resin, which is in itself a detrimental factor affecting the structural integrity of the tank. Moreover, fiber-resin separation, in effect, creates a multiplicity of discontinuities in the resin which constitute points of stress concentration causing crazing of the resin, particularly upon pressure cycling of the tank. Additionally, fiber-resin separation provides additional surface area exposed to the interior of the tank, which greatly increases the amount of surface area exposed to fluids contained in the tank, and particularly corrosive fluids.

DETAILED DESCRIPTION OF THE INVENTION

Figure 1:
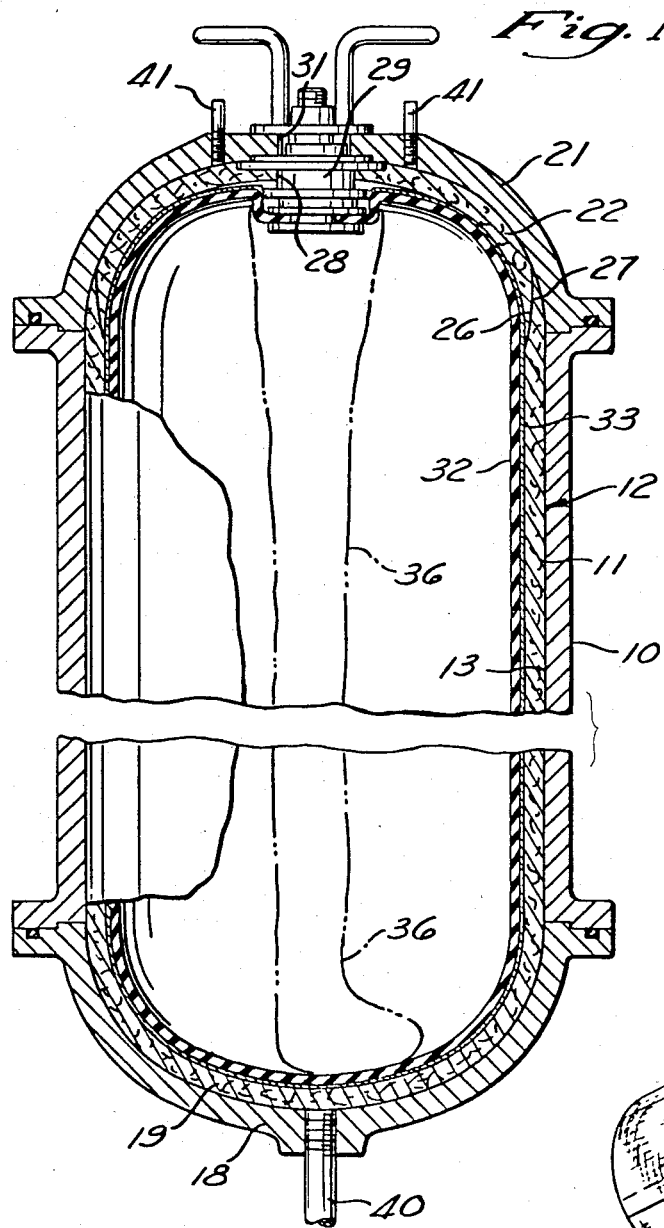
FIG. 1 is a cross sectional view of a mold assembly having disposed therein fiber matting compressed between the outer mold casing and the inner inflatable core.
Figure 2:
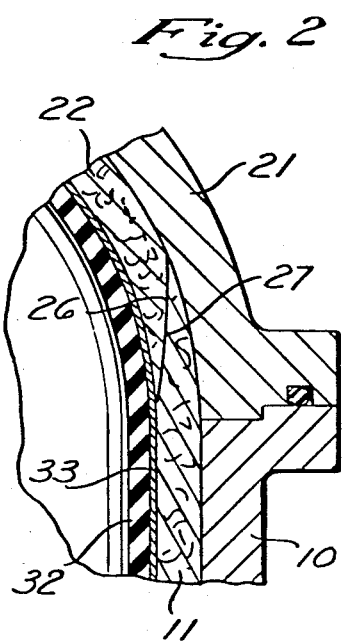
FIG. 2 is a view on an enlarged scale of a portion of FIG. 1 taken at an end of the cylindrical wall section of the assembly.

Referring now to the figures, a molding assembly 9 includes a rigid cylindrical mold casing 10 surrounding a cylindrical sidewall portion 11 of a molded article or tank 12 of fiber-reinforced resin. The inner surface 13 of the cylindrical mold casing 10 defines the outer surface of the cylindrical portion 11 of the tank 12. A rigid, domed mold casing end wall cap 18 is secured to the lower end of the cylindrical casing 10. This domed end cap 18 forms an outwardly convex bottom end wall 19 of the tank. At the upper end of the cylindrical mold casing 10 a rigid mold casing end wall cap 21, similar to the lower end cap 18, is provided to form a top end wall 22 of the fiber-reinforced tank 12.

Fiber-reinforcing material for the end wall 22 of the tank is provided in the form of a cup-shaped fiber preform whose production is familiar to those skilled in the art. The cylindrical sidewall portion 11 and the end wall 19 are integrally formed by the techniques set forth in U.S. Pat. No. 3,654,002. With the rigid mold casing end wall cap 21 removed, the preform, which includes the sidewall portion 11 and the end wall portion 19, is inserted in the mold.

The end wall 22 is provided with an aperture 28 at its center or apex. Ultimately, this aperture may become a port in the finished tank. An inflation tube assembly 29 is inserted through this aperture 28 and a corresponding opening or hole 31 in the upper mold end wall cap 21. The inflation tube assembly 29 is adapted to sealingly clamp a mouth of an inflatable envelope or bag 32 of a rubber or similar elastomeric material. The rubber bag 32 comprises an inflatable mold core. As may be seen in FIGS. 3 and 4, a sleeve, consisting of a polyester fiber surfacing fabric 33, is slipped over the bag 32, and one end thereof is cupped around the tube assembly 29. The other end of the sleeve is folded over the end of the bag.

Figure 3:
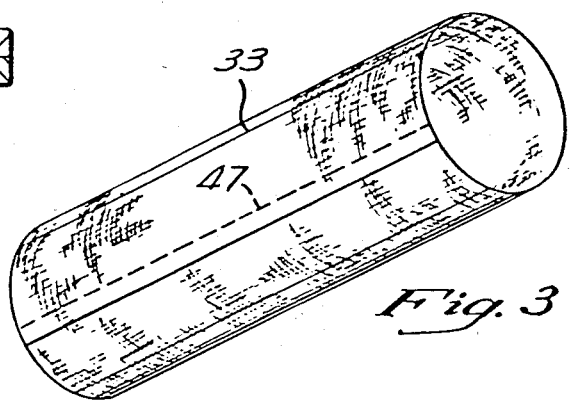
FIG. 3 is a perspective view of a surfacing fabric sleeve employed in the molding process of this invention.
Figure 4:
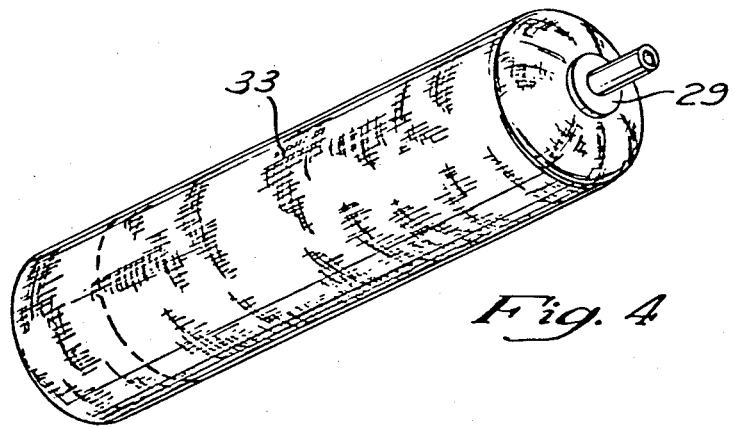
FIG. 4 is a perspective view, similar to FIG. 3, showing a bag encased in the sleeve of FIG. 3.

Desirably, the polyester fiber surfacing fabric comprises a binder-free material having its fibers intertangled so that the fabric has both vertical and horizontal fiber orientation. Preferably, the fabric is a polyester fabric produced by Burlington Glass Fabrics Company under the trademark "NEXUS." According to the manufacturer, this fabric is 1.5 denier Dacron type 106 homopolymer staple. The fiber elongation at break is approximately 25 percent, and contains small amounts of titanium dioxide and an optical brightener to improve fabric whiteness. Neither additive adversely affects corrosion resistance. These fabrics conform readily to contoured surfaces and are quickly wet by polyester, vinyl ester, and epoxy laminating resins. The dry and wet tensile strengths of these fabrics are superior to both C-glass mat and commonly used adhesive bonded polyester and modacrylic fiber surfacing veils. It is also desirable to employ an apertured fabric designated as "Style 1012" by the manufacturer. The material is formed into a sleeve by an ultrasonically formed seam 47, as shown in FIG. 3.

The mold is completely assembled by clamping the upper cap 21 on the cylindrical casing 10 to enclose the fiber form. The rubber bag 32 is in its deflated state, indicated generally by the phantom lines 36. As the upper cap is being assembled, the preform for the end wall 22 is positioned inside the edges 26 of the sidewall 11. It should be noted that mating edges 26 and 27 of the fiber matting of the sidewall 11 and the preform for the top end wall 22, respectively, are tapered to form a uniform wall joint.

The fibers reinforcing the sidewalls may be loosely felted glass fibers held together with a suitable high solubility binder in a relatively compressible and porous form. After the rubber bag 32 and the surrounding sleeve 33 are inflated to hold the fiber form against the rigid mold casing, a conventional liquid resin, such as a polyester or vinyl ester settable by heat, a catalyst, or the like, is introduced to a supply line 40. The amount of resin introduced into the mold is sufficient to permeate the entire fiber body and provide a slight excess to ensure that all of the air will be driven out of the mold through a set of vents 41. The compression of the fiber body lay-up by the rubber bag 32 is effective in preventing migration of the individual fibers of the lay-up with the flow of impregnating resin. To accelerate the permeation of the lay-up the pressure in the bag is increased.

The presence of the surfacing fabric against the fiber lay-up promotes a resin-rich coating on the inside of the tank, which is substantially free of glass fibers and which provides a protective barrier between liquids in the tank and the fibers, which might tend to draw the liquid through the sidewall of the tank.

The rubber bag 32 may be encased in a protective sheath of polyvinyl acetate film or nylon film, or similar material, which will protect the folding resin against the chemical action of vulcanizing agents or residues thereof associated with the bag.

Although a preferred embodiment of this invention is illustrated, it is to be understood that various modifications and rearrangements of parts may be resorted to without departing from the scope of the invention.

What is claimed is:

1. A hollow fiber-reinforced resin article comprising a hollow body including a cylindrical center wall portion and domed end portions, said body comprising a cured resin distributed homogeneously throughout the body as a seamless monolithic mass, in permeating relationship with a hollow reinforcing lay-up of loosely felted reinforcing fibers defining the shape of said body and in permeating relationship with an inner surfacing lay-up of stretchable polyester fibers covering the entire inner surfaces of the reinforcing fibers, the relative concentrations of resin and fiber in said hollow reinforcing lay-up and in said surfacing lay-up being non-uniform with the magnitude of the fiber-to-resin ratio being less in the surfacing lay-up than in the reinforcing lay-up.

2. A hollow article according to claim 1, wherein said surfacing lay-up comprises intertangled polyester fibers.

3. A hollow article according to claim 2 wherein said surfacing lay-up is apertured.

* * * * *